Sept. 5, 1939. H. C. GUILD Re. 21,196

MULTISTAGE COMPRESSOR

Original Filed Nov. 5, 1927

INVENTOR,
Herbert C. Guild

BY
Harry A. Totten
ATTORNEY.

Reissued Sept. 5, 1939 Re. 21,196

UNITED STATES PATENT OFFICE 21,196

MULTISTAGE COMPRESSOR

Herbert C. Guild, New York, N. Y., assignor, by mesne assignments, to General Motors Corporation, Detroit, Mich., a corporation of Delaware Original No. 1,746,394, dated February 11, 1930, Serial No. 231,179, November 5, 1927. Application for reissue April 29, 1937, Serial No. 139,725

11 Claims. (Cl. 230—191)

This invention relates to gas, air or vapor compressors and more particularly to those compressors used in refrigerating machines of what is known as the compression type.

One of the objects of the invention is to produce an apparatus of a more constant volumetric efficiency designed for handling of the gases compressed in such manner that their volume increase, due to superheating upon entering the apparatus, is held to a minimum.

Another object is to have the gases pass through the machine in a flow or stage direction corresponding with the direction of heat of compression; the coldest gas entering at the coldest part of the apparatus, the intermediate temperature gas being confined to the intermediate temperatured part of the apparatus, and the hottest gas passing out at the hottest part of the apparatus, and by this means minimizing the heat or energy slip back from compressed high temperature gas to uncompressed low temperature gas.

Another object is to reduce the cost of a two stage compressor by utilizing the crank case or chamber for the inter-cooler space between stages.

Another object is to produce a higher pressure on the stuffing box than the pressure in the low pressure side and a lower pressure on the stuffing box than on the high pressure side.

Another object is to have the crank case oil chamber at a more efficient oil separating temperature for the purpose of more easily evaporating any entrained refrigerating media that may pass into it.

Another object is to eliminate an open passage from the crank case to evaporator and thus prevent heat slipping back during the stop period into the low temperature side that has been already taken out.

Another object is to make a more compact and cheaper construction.

With the above mentioned and other objects in view, the invention consists in the novel construction and combination of parts hereinafter described, illustrated in the accompanying drawing and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention reference is directed to the accompanying drawing, wherein—

Figure 1:
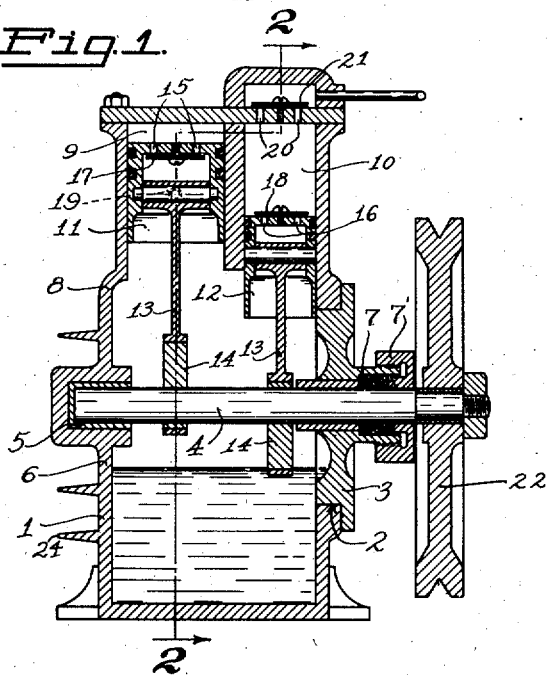
Fig. 1 is a view in vertical section of one embodiment of the apparatus for carrying out my invention.
Figure 2:
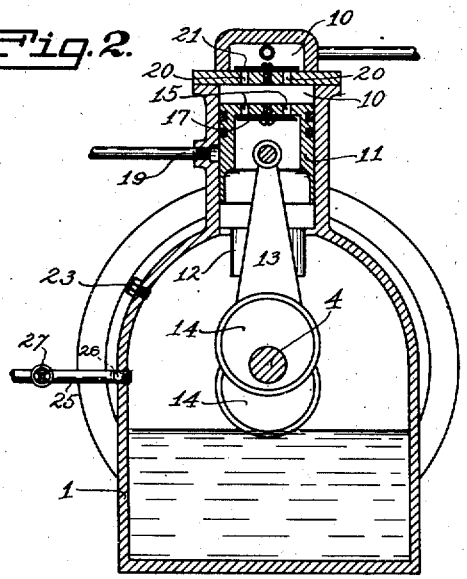
Fig. 2 is a similar view taken on section line 2—2 of Fig. 1.

In the drawing wherein like characters of reference designate corresponding parts in the several views, 1 indicates a crank case provided in its side wall with an opening 2 closed by a removable plate 3. The plate 3 is provided with a shaft opening through which into the crank case extends a crank shaft 4, the inner end of which rotates in a fixed bearing 5 on the inner face of the opposite side wall 6 of the crank case. A stuffing box 7 surrounds the shaft where it passes through the opening in the plate 3, and the adjustable take-up 7' precludes pressure in the crank case passing therefrom around the shaft.

The crank case mounts a block 8 formed with a pair of cylinders 9 and 10 therein, disposed with their lower ends in communication with the crank case, the cylinder 9 being of a bore larger than that of cylinder 10.

Within the respective cylinders reciprocate the pistons 11 and 12, connected through connecting rods 13 with the cams 14 on shaft 4, the cams affording conventional crank throws.

The head of each piston is ported as at 15 and 16, and said ports are controlled respectively by valves 17 and 18, illustrated in the form of plates, the valve 17 closing the port 15 of the piston 11 on the underside of the piston head, and valve 18 closing port 16 of piston 12 on the upper side of the piston head.

It will thus be observed that the valves of the respective pistons operate in different directions. The cylinder 9 at a point slightly above the point of the lower end of the stroke of the piston therein is formed with an inlet port 19, and the upper end of cylinder 10 is provided with an outlet orifice 20, controlled by an outwardly opening valve 21, the orifice connecting with a pressure line or container, not shown.

A drive or fly wheel 22 is mounted on the end of shaft 4 and in the present embodiment power for rotating the shaft is delivered thereto.

The mechanism of the compressor is preferably splash lubricated, the lubricant being contained in the crank case and preferably maintained at the level indicated in the drawing, the lubricant being supplied to the crank case through the filler opening, normally closed by a plug 23.

With the shaft 4 rotating in the desired direction, the down stroke of piston 11 will create a vacuum in the cylinder 9 until the head of the piston uncovers port 19. During this operation, the downward movement of the piston, it being of greater displacement area than the piston in the adjoining cylinder, compresses the gases within the crank case. At this same time the piston 12 is moving upwardly in the cylinder 10, and the gases contained within the cylinder above the piston are compressed therein, seating valve 18, and on its pressure arriving at a point approximating that in the container, not shown, connected with the outlet orifice 20, the valve 21 will be lifted and the gases discharged through the orifice 20. On the next cycle of operation, that is the upward reciprocation of the piston 11 will compress the gases in cylinder 9 above the inlet orifice 19 and its pressure will unseat valve 17, enabling the gas to pass downwardly into the crank case.

At this time piston 12 is moving downwardly, valve 21 being held in closed position by the pressure in the container, not shown, and valve 18 is unseated, admitting the passage of gases through ports 16, the gases passing through the ports being under pressure, due to the increased displacement area of piston 11 over that of piston 12.

It will thus be observed that the gases entering the compressor through inlet 19 are compressed in successive stages prior to passing through the orifices 20, also that the gases pass through the apparatus in a compression stage direction corresponding with the direction of heat of compression, the coldest gases being admitted into the cylinder 9; the intermediate temperature gases being contained in the crank case 1, and the gases of highest temperature passing from the apparatus through the cylinder 10.

It will be observed that the valves in the present apparatus are of simple structure and positive operation; also that the liability of the gases of intermediate pressure contained within the crank case are precluded from escaping therefrom around the shaft 4 by the stuffing box 7.

It will be observed that the rotation of the member 22 in the form of a fan wheel, directs a current of air over means or elements 24, illustrated in the form of fins, associated with the crank case. This action removes some of the heat of compression produced in the first stage of compression, and also, should the crank case receive entrained refrigerating media, raises the temperature of this media by directing air against the members 24.

It will be observed that dependent on the temperature within the crank case, the action of the air created by member 22 raises the temperature when one condition exists, and lowers the temperature to that of the surrounding air when another condition exists.

While the means 24 is illustrated in the form of fins, it is to be understood that any suitable construction for accomplishing the above result may be employed.

When used in certain installations, it may be desirable to admit into the crank case a gas of a pressure intermediate that in the cylinders 9 and 10. To accomplish this there is provided an inlet pipe 25 leading into the crank case and provided with a check valve 26 opening or unseating against the pressure in the crank case. This pipe 25 is preferably connected with or leads from an evaporator, not shown, and a valve 27 therein serves to interrupt the gas flow therethrough. It will thus be apparent that when a supply of gas is available at a pressure higher than that compressed in the cylinder 9 and it is desired to compress this gas to a higher pressure in cylinder 10, the same may be, without stepping it down and without efficiency loss delivered to the crank case 1 through pipe 25 and raised to a higher compression in cylinder 10.

I claim:

1. A multiple-stage compressor comprising a crank case, a pair of cylinders opening thereinto and one of a greater area than the other, a piston in each cylinder, one of a greater displacement than the other, a port in each piston, a valve controlling the port in each piston, the valve controlling the port in the piston of greatest displacement opening into the crank case, said crankcase having an effective volume greater than the displacement of said piston, the valve controlling the port in the other piston opening into its cylinder, a valve controlled port leading from the latter cylinder, and a gas inlet port communicating with the cylinder of greatest diameter.

2. A multiple-stage compressor comprising a pair of compression elements, one of greater displacement than the other, a chamber intermediate the elements for receiving the compression from one element and transferring it to the other and within which it is compressed by the action of said compression elements, a controlled inlet port into the element of greater displacement, a valve controlled outlet leading from the element of smaller displacement, and means for simultaneously operating said compression elements in opposite directions, said chamber constituting the crank case for said elements.

3. A multiple-stage compressor comprising a plurality of compression elements, certain of the elements being of greater displacement than the others, a chamber intermediate certain of the elements for receiving the compression from one element and transferring it to a succeeding element and within which chamber the compression is held by the action of said compression elements, a controlled inlet port leading into the element of greater displacement, a valve controlled outlet port leading from another of the compression elements, means for simultaneously operating said compression elements, and means for admitting gas directly into the intermediate compression chamber at a pressure between that generated by the compression elements, said intermediate compression chamber constituting the crank case for said elements, said intermediate chamber having an effective volume greater than the displacement of said elements.

4. A multiple-stage compressor comprising a plurality of compression elements, certain of the elements being of greater displacement than the others, a chamber intermediate certain of the elements for receiving the compression from one element and transferring it to a succeeding element and within which chamber the compression is held by the action of said compression elements, a controlled inlet port leading into the element of greater displacement, a valve controlled outlet port leading from another of the compression elements, means for simultaneously operating said compression elements, means associated with the chamber for absorbing the heat of the gases within the chamber, and means for directing an air current onto the walls of said means to maintain the temperature thereof substantially corresponding with atmospheric temperature, said chamber constituting the crankcase of at least one of said compression elements.

5. A multiple-stage compressor comprising a plurality of compression elements, certain of the elements being of greater displacement than the others, a chamber intermediate certain of the elements for receiving the compression from one element and transferring it to a succeeding element and within which chamber the compression is held by the action of said compression elements, a controlled inlet port leading into the element of greater displacement, a valve controlled outlet port leading from another of the compression elements, means for simultaneously operating said compression elements, fin means associated with the chamber for absorbing the heat of the gases within the chamber, and means for directing an air current onto the chamber walls having said fin means to maintain the temperature thereof substantially corresponding with atmospheric temperature, said chamber constituting the crank case of all of said compression elements, said chamber having an effective volume greater than the displacement of said elements.

6. A multiple-stage compressor comprising a plurality of compression elements, certain of the elements being of greater displacement than the others, a chamber intermediate certain of the elements for receiving the compression from one element and transferring it to a succeeding element and within which chamber the compression is held by the action of said compression elements, a controlled inlet port leading into the element of greater displacement, a valve controlled outlet port leading from another of the compression elements, and means for simultaneously operating said compression elements in opposite directions, said chamber constituting the crank case of at least one of said compression elements.

7. A multiple-stage compressor comprising a plurality of compression elements, certain of the elements being of greater displacement than the others, a chamber intermediate certain of the elements for receiving the compression from one element and transferring it to a succeeding element and within which chamber the compression is held by the action of said compression elements, a controlled inlet port leading into the element of greater displacement, a valve controlled outlet port leading from another of the compression elements, means for simultaneously operating said compression elements, and means for admitting gas directly into the intermediate compression chamber at a pressure between that generated by the compression elements, said intermediate compression chamber constituting the crankcase for at least one of said elements, said crankcase having an effective volume greater than the displacement of said elements, said chamber constituting the crankcase being provided with fins for increasing the heat transfer through the walls of the crankcase in order to dissipate the heat of compression.

8. A multi-stage compressor comprising a plurality of compression elements, certain of the elements being of greater displacement than the others, a chamber intermediate certain of the elements for receiving the compression from one element and transferring it to a succeeding element and within which chamber the compression is held by the action of said compression elements, a controlled inlet port leading into the element of greater displacement, a valve controlled outlet port leading from another of the compression elements, means for simultaneously operating said compression elements, means associated with the chamber for absorbing the heat of the gases within the chamber, and means for directing an air current onto the walls of said means to maintain the temperature thereof substantially corresponding with atmospheric temperature, said chamber constituting the crankcase of at least one of said compression elements, said chamber having an effective volume greater than the displacement of said compression elements.

9. A multi-stage compressor comprising a pair of compression elements, one of greater displacement than the other, a crankcase chamber intermediate the elements for receiving the compressed gas from one element and transferring it to the other and within which it is compressed by the action of said compression elements, said crankcase having an effective volume greater than the displacement of said elements, a controlled inlet port into the element of greater displacement, a valve controlled outlet leading from the element of smaller displacement, and means for simultaneously operating said compression elements.

10. A multi-stage compressor comprising a plurality of compression means, a crankcase chamber intermediate the compression means for receiving compressed gas from one compression means and transferring it to a succeeding compression means, said chamber constituting the crankcase of at least one of said compression means, a valve controlled inlet port means leading into a compression means, a valve controlled outlet port means leading from the compression means, the total displacement of the compression means having the controlled inlet port means being greater than the total displacement of the compression means having the controlled outlet port means, said chamber having an effective volume greater than the displacement of said compressing means, and means for simultaneously operating said compressing means, said gas being continuously compressed within said chamber by the action of the compression means during the operation of the compressor.

11. A two-stage compressor for compressible fluids comprising a primary compression means, a secondary compression means, said primary compression means being of greater displacement than said secondary compression means, and a crankcase chamber between said primary and secondary compression means, said primary compression means compressing fluid into said crankcase chamber and said secondary compression means pumping the fluid out of said crankcase chamber, the fluid pressure in said crankcase chamber being maintained, at all times during the operation of the compressor, at a pressure substantially higher than the pressure at which the fluid is introduced into the primary compression means.

HERBERT C. GUILD.